United States Patent [19]

Ainsworth

[11] Patent Number: 4,554,623
[45] Date of Patent: Nov. 19, 1985

[54] FIRING-ANGLE CONTROL IN INVERTERS

[75] Inventor: John D. Ainsworth, Stafford, England

[73] Assignee: Associated Electrical Industries Limited, England

[21] Appl. No.: 578,514

[22] Filed: Feb. 9, 1984

[30] Foreign Application Priority Data

Feb. 14, 1983 [GB] United Kingdom ............... 8304016

[51] Int. Cl.$^4$ ............................................ H02M 1/08
[52] U.S. Cl. ............................... 363/96; 307/252 M; 363/137
[58] Field of Search ..................... 363/96, 97, 98, 135, 363/136, 137, 138; 307/252 M

[56] References Cited

U.S. PATENT DOCUMENTS

| 3,474,321 | 10/1969 | Ainsworth | 363/94 |
| 3,863,134 | 1/1975 | Pollard | 363/137 |

FOREIGN PATENT DOCUMENTS

| 167116 | 6/1982 | Japan | 363/96 |
| 56-16403 | 8/1982 | Japan | 363/137 |
| 777789 | 11/1980 | U.S.S.R. | 363/44 |

Primary Examiner—Peter S. Wong
Assistant Examiner—D. L. Rebsch
Attorney, Agent, or Firm—Kirschstein, Kirschstein, Ottinger & Israel

[57] ABSTRACT

A multi-phase inverter comprising a bridged array of thyristors periodically fired in sequence by a source of firing pulses has a circuit arrangement for controlling each extinction angle ($\gamma$) of the thyristors individually. Said circuit arrangement comprises an adder for summing $\gamma$ signals and adder for differencing said sums to generate an error signal and, said error signal being applied to said source of firing pulses at appropriate phase angles to appropriate thyristors so as to tend to equalize said sums, the number of pairs of differenced sums being equal to the number of thyristors in the array. Preferably each error signal acts as a constant multiplier of a correction signal which is a harmonic of the A.C. output frequency of the inverter. The arrangement improves the efficiency by enabling each $\gamma$ to be minimized individually without risk of commutation failure.

9 Claims, 7 Drawing Figures

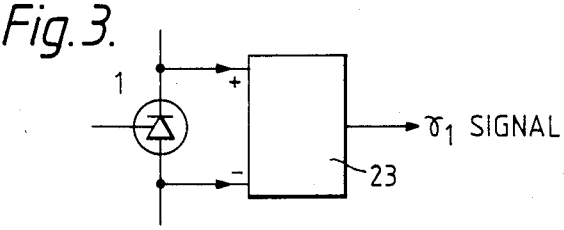
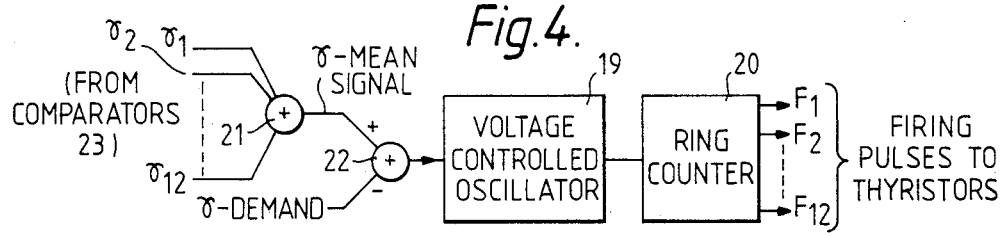
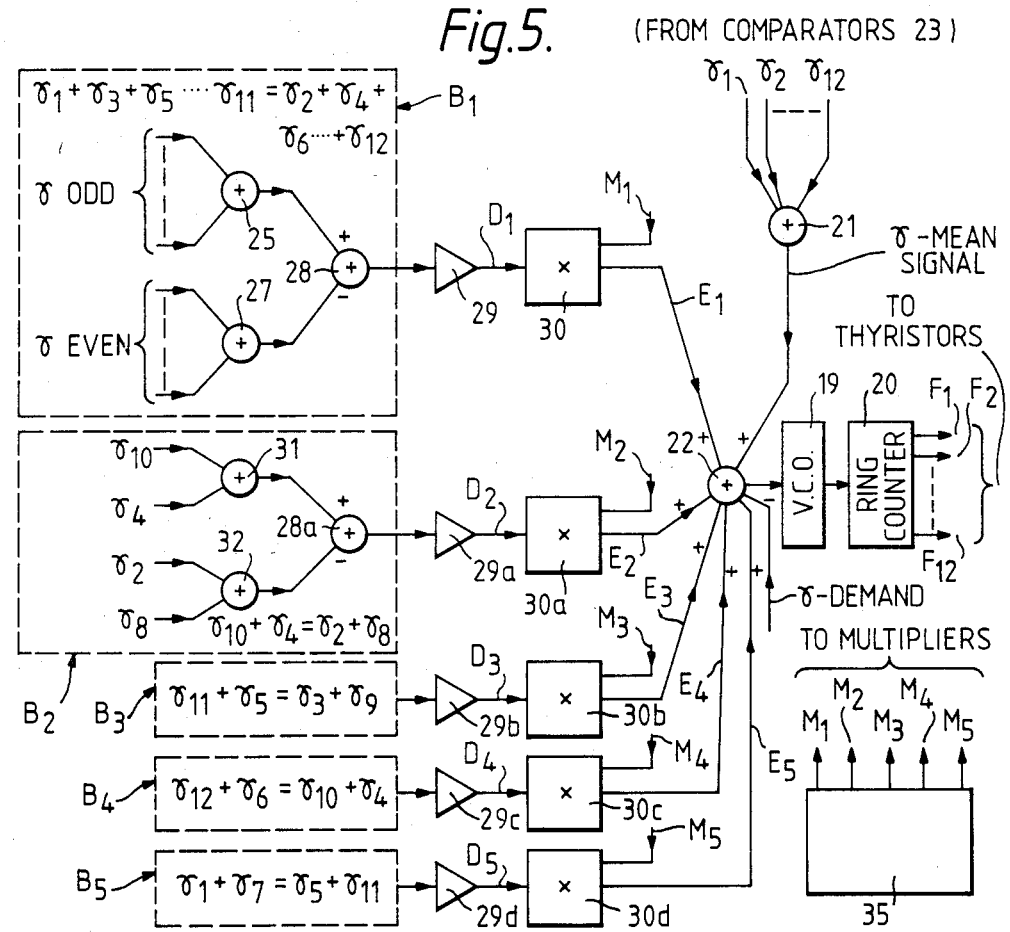

FIRING-ANGLE CONTROL IN INVERTERS

FIELD OF THE INVENTION

The present invention relates to the control of multi-phase inverter arrangements of the type comprising a bridged array of gate-controlled unidirectional switching devices (typically thyristors) fired sequentially so as to power an A.C. load from a D.C. supply.

BACKGROUND OF THE INVENTION

It is desirable in principle to fire each such switching device immediately before the zero-crossing point of its anode-cathode voltage but in practice this is not possible. This is because the conductivity of any practical such switching device takes a finite time (in terms of electrical degrees, the "overlap angle" u) to increase to its maximum value after it is fired and conversely, to fall to zero after its anode-cathode current falls to zero. In order to prevent commutation failure, each such switching device in an inverter must be fired sufficiently early for the conduction of the preceding thyristor to fall to zero before its anode/cathode voltage again goes positive and the same thyristor re-fires. This period is determined by the reactive behavior of the load. The period in electrical degrees between the point at which the forward conduction falls to zero (at which point the anode-cathode voltage jumps to a negative value) and the positive-going zero-crossing point represents a margin of safety and is defined as the margin or extinction angle $\gamma$. The period in electrical degrees between the firing of the controlled switching device and said zero crossing point defines the firing angle $\beta$. Hence $\beta = \gamma + u$. One of the methods disclosed in U.S. Pat. No. 3,474,321 (U.K. Pat. No. 1,171,953 which is incorporated herein by reference) provides for controlling $\gamma$ in an inverter such that the mean of the instantaneous $\gamma$'s of the thyristor switching devices may be stabilized at a pre-set "demand" value. However in practice, imbalance in the phases of the A.C. load circuit may affect the voltage zero crossing points of the thyristors and thereby cause inequality in the associated $\gamma$'s. Hence known inverter control systems have until now used the alternative method disclosed in U.S. Pat. No. 3,474,321 whereby a conservative demand value of mean $\gamma$ is chosen so that no individually falls below a critical value in the presence of phase imbalance. Such control systems have the disadvantage that under conditions of imbalance of A.C. systems voltages, although the smallest $\gamma$ will be at the correct value, the average $\gamma$ will be larger, resulting in low D.C. voltage and inefficient plant utilization.

An object of the present invention is to provide an inverter in which the values of $\gamma$ for the switching said devices are more closely controlled so that the efficiency of the inverter may be optimized.

SUMMARY OF THE INVENTION

According to the present invention a multi-phase inverter comprises a bridged array of phase-controlled unidirectional switching devices, a controllable source of firing pulses for said switching devices, the phase of individual firing pulses being controllable by a phase control system comprising means for measuring the extinction angle ($\gamma$) of each such switching device, means for comparing the values of selected extinction angles and deriving at least one net difference signal, and means for applying the or each said net difference signal as a control signal to said source of firing pulses at times corresponding to the firing instants of those said switching devices which determines the selected extinction angles and in a sense such as to tend to equalize said selected extinction angles.

Preferably said means for comparing the values of selected extinction angles compares sums each of two or more of said selected extinction angles of respective phase-controlled unidirectional switching devices.

Preferably said control signal is generated by a multiplier which multiplies the net difference signal by a modulating signal, the modulating signal having a fundamental frequency which is equal to, or a harmonic of, the A.C. output frequency of the inverter and being phased so as to cause the phase control system to have maximum effect on those firing instants which determine the selected extinction angles ($\gamma$).

The modulating signal should be so phased that the phase control system advances the firing point of such a switching device (i.e. increases $\beta$ for the switching device) whenever the extinction angle $\gamma$ determined by that $\beta$ (according to $\beta = u + \gamma$) is too small, and vice versa. It should be noted that the value of $\gamma$ measured across any given such switching device is determined by the firing instant of the preceding such switching device in the firing sequence.

Although the precise waveform of such a modulating signal is not critical, its fundamental frequency and waveform should be chosen so as to have as little effect as possible on the unselected extinction angles.

Furthermore the difference signal should preferably be time-averaged over at least one cycle of the A.C. output so that it is treated in effect as a virtually constant multiplier of the modulating signal. The speed of response of the control system will depend on the degree of smoothing of the difference signal.

Preferably an inverter in accordance with the present invention additionally incorporates feedback means for controlling the mean value of $\gamma$ of all the said switching devices, for example of the type disclosed in U.S. Pat. No. 3,474,321. Such an inverter may then incorporate a plurality of phase-control systems in accordance with the invention, each control system balancing a different set of $\gamma$ values. The number of control systems and the particular sets of $\gamma$ values which are balanced may then be chosen so as to control any or all the degrees of freedom (equal to the number of such switching devices employed) of the inverter, so that each such switching device may be controlled individually if necessary.

BRIEF DESCRIPTION OF THE DRAWINGS

The invention may be further understood by reference to FIGS. 1 to 8 of the accompanying drawings, of which:

FIG. 3 shows schematically one arrangement for measuring $\gamma$;

FIG. 4 shows a known form of feedback circuit for controlling the mean $\gamma$ in a thryistor controlled inverter;

FIG. 5 shows schematically, by way of example, one particular control circuit for an inverter in accordance with the invention;

DETAILED DESCRIPTION OF THE PREFERRED EMBODIMENT

Figure 1:
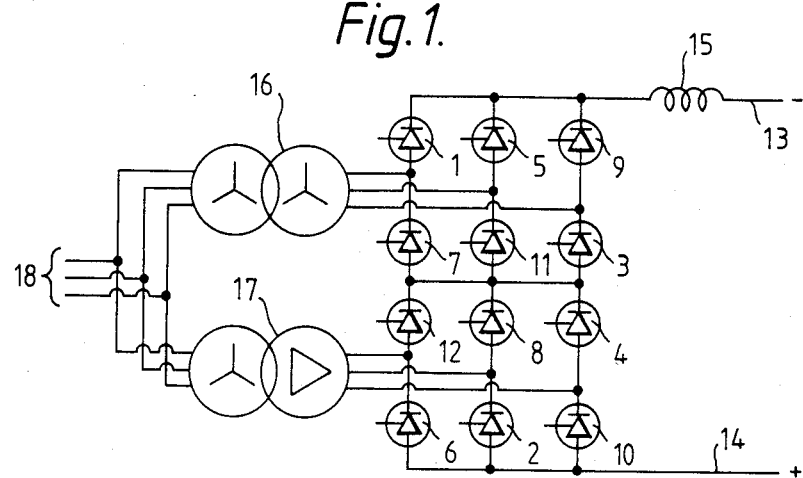
FIG. 1 is a circuit diagram of a known basic twelve pulse thyristor-controlled inverter.

The inverter shown in FIG. 1 is connected between D.C. supply lines 13 and 14 and a three-phase transmission line 18. Thyristors 1 to 12 (numbered in order of firing sequence) are connected to form two bridges connected in series with respect to the D.C. side of the inverter and in parallel with respect to the A.C. side of the inverter. The outputs from the bridges are shifted by 30° by employing a star-star connected transformer 16 and a star-delta connected transformer 17 respectively to connect the bridges to the A.C. transmission line.

Figure 2:
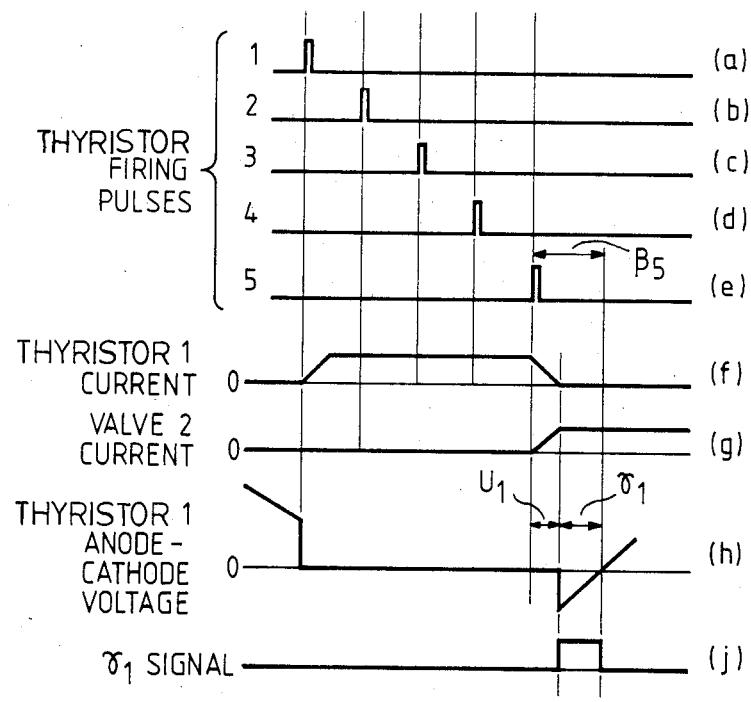
FIG. 2 shows schematically a typical sequence of firing pulses and waveforms in the thyristors of such an inverter.

Such an inverter requires a set of 12 firing pulse sources (not shown) to fire the 12 thyristors; in steady state balanced operation the firing pulses are at equal relative spacings of 30°. FIG. 2 shows some selected waveforms for the valves. FIGS. 2(a)–2(e) show firing pulses to thyristors 1 to 5, numbered in the normal firing sequence. FIG. 2(f) shows current in thyristor 1; this is initiated by its own firing pulse, and is terminated by the firing of thyristor 5. However, the current in thyristor 1 requires a finite commutation overlap time $u_1$ electrical degrees to commutate to zero, while current in thyristor 5, FIG. 2(g), simultaneously rises to the D.C. line current value.

FIG. 2(h) shows the anode-cathode voltage of thyristor 1. This anode-cathode voltage is substantially zero during conduction, but jumps to a negative value at the moment its current reaches zero; it then rises until it crosses zero and becomes positive. The time (in electrical degrees) during which this voltage is negative is known as the extinction angle, gamma ($\gamma$); it is necessary for this angle to be above a certain value (say 6°) for each thyristor in normal operation to ensure full recovery of the thyristors, otherwise a thyristor may re-conduct prematurely as its voltage rises past zero, causing commutation failure and collapse of normal operation.

The time at which thyristor 1 voltage rises past zero corresponds to an A.C. voltage zero crossing, and it is convenient to define the firing angle of thyristor 5 as the time of its firing in electrical degrees ($\beta_5$) before this time instant. Thus from FIG. 2 it will be seen that $\gamma_1 = \gamma_5 - u_1$ so that $\gamma_1$ is determined by $\gamma_5$ in the sense defined hereinabove.

In ideal balanced operation the values of the 12 firing angles ($\beta_1$ to $\beta_{12}$) are all equal, and the values of overlap angles ($u_1$ to $u_{12}$) are all equal, hence the values of extinction angle ($\gamma_1$ to $\gamma_{12}$) are all equal. It is normally necessary to operate an inverter at the smallest value of $\gamma$ consistent with reasonable freedom from commutation failure due to moderate transients, a value of $\gamma = 15°$ being typical. The value of $\beta$ is then typically 40° at full load current.

It is convenient to generate signals indicating $\gamma$ in mark-space form, as shown in FIG. 2(j). Such a signal is readily generated by means of a comparator 23 (FIG. 3) which generates a constant output signal whenever the anode-cathode voltage of thyristor 1 is negative.

FIG. 4 shows a known control system for controlling the mean value of $\gamma$ in an inverter of the type shown in FIG. 1. Signals $\gamma_1 - \gamma_{12}$, which may be in mark-space form as generated by the comparator 23 in FIG. 3 or alternatively in the form of D.C. signals proportional to the respective $\gamma$ values, as described for example in U.S. Pat. No. 3,474,321, are added in a first adder 21. The output of adder 21 (which typically has a response time of 30 electrical degrees or less) is a D.C. directly proportional to the mean of $\gamma_1$ to $\gamma_{12}$ and is fed to a second adder 22. A $\gamma$-demand signal in the form of a constant D.C. voltage is subtracted in adder 22 and the resulting error signal fed to voltage controlled oscillator 19 which in turn feeds a twelve stage ring counter 20. Thus oscillator 19 and ring counter 20 together constitute a controllable source of firing pulses. Corresponding firing pulses $F_1$ to $F_{12}$ are fed at phase intervals of approximately 30° to the respective gates of thyristors 1 to 12. If the mean of $\gamma_1$ to $\gamma_{12}$ is too high in comparison with the demand signal, the control or error signal fed to the V.C.O. 19 is positive and the oscillator frequency increases, thereby advancing the next firing pulse, which corresponds to a decrease in $\beta$ and hence in $\gamma$. Thus the control system acts as a negative feedback loop with an integral characteristic.

FIG. 5 shows a preferred control system in accordance with the invention for controlling the inverter of FIG. 1. The system comprises an adder 22 into which is fed a $\gamma$-mean signal from adder 21 and a $\gamma$-demand signal as in the arrangement shown in FIG. 4. Additionally, error signals $E_1$ to $E_5$ are fed to positive inputs of adder 22, by way of amplifiers 29 and multipliers 30, from respective balancing circuits $B_1$ to $B_5$. The error signals $E_1$ to $E_5$ are generated from respective difference signals $D_1$ to $D_5$ and modulating signals $M_1$ to $M_5$ from a signal generator 35 by respective multipliers 30, 30a, 30b, 30c and 30d.

Balancing circuit $B_1$ comprises an adder 25 which sums odd-number $\gamma$-signals (which are in mark space form as in FIG. 2(j)) and an adder 27 which sums even-numbered $\gamma$-signals. Each $\gamma$-signal $\gamma_i$ is measured across the i th thyristor in the firing sequence. Adder 28 generates a signal proportional to the difference between the sums of the odd and even $\gamma$'s and this is amplified and smoothed over several half cycles by amplifier 29 to generate difference signal $D_1$. Balancing circuit $B_2$ balances the partial sums $\gamma_{10}+\gamma_4$ and $\gamma_2+\gamma_8$ via adders 31, 32 and 28a in a similar manner to circuit $B_1$. Balancing circuit $B_3$ balances $\gamma_{11}+\gamma_5$ with $\gamma_3+\gamma_9$, circuit $B_4$ balances $\gamma_{12}+\gamma_6$ with $\gamma_{10}+\gamma_4$ and circuit $B_5$ balances $\gamma_1+\gamma_7$ with $\gamma_5+\gamma_{11}$. The outputs $D_3, D_4, D_5$ are smoothed and amplified by amplifiers 29b, 29c and 20d respectively. It should be noted that the responses of the balancing circuits are much slower than adder 21 which controls mean $\gamma$, and that signals $D_1$ to $D_5$ are virtually D.C. in comparison with the A.C. output frequency of the inverter. Signals $D_1$ to $D_5$ may be positive or negative depending on the sense in which the $\gamma$ sums are imbalanced. Before considering the way in which modulating signals $M_1$ to $M_5$ and difference signals $D_1$ to $D_5$ serve to control the ring counter 20 it should be noted that in order to control each $\gamma$ individually, it is necessary to control each of the 12 degrees of freedom of the system. A convenient method of achieving this is to control mean $\gamma$ and to balance the following eleven pairs of partial $\gamma$ sums which constitute the additional eleven degrees of freedom of the system:

$$\gamma_1+\gamma_3+\gamma_5+\gamma_7+\gamma_9+\gamma_{11}=\gamma_2+\gamma_4+\gamma_6+\gamma_8+\gamma_{10}+\gamma_{12} \quad (1)$$

$$\gamma_{10}+\gamma_4=\gamma_2+\gamma_8 \quad (2)$$

$$\gamma_{11} + \gamma_5 = \gamma_3 + \gamma_9 \quad (3)$$

$$\gamma_{12} + \gamma_6 = \gamma_{10} + \gamma_4 \quad (4)$$

$$\gamma_1 + \gamma_7 = \gamma_5 + \gamma_{11} \quad (5)$$

$$\gamma_{10} = \gamma_4 \quad (6)$$

$$\gamma_{11} = \gamma_5 \quad (7)$$

$$\gamma_{12} = \gamma_6 \quad (8)$$

$$\gamma_1 = \gamma_7 \quad (9)$$

$$\gamma_2 = \gamma_8 \quad (10)$$

$$\gamma_3 = \gamma_9 \quad (11)$$

The system shown in FIG. 5 only controls mean $\gamma$ and the pairs of partial $\gamma$ sums contained in equations 1 to 5. In order to rigidly control each $\gamma$ individually it would be necessary to incorporate additional balancing circuits each comprising a single adder which subtracts one $\gamma$ from another according to equations 6 to 11. However I have found that particular balancing circuits respond to particular causes of imbalance, so that when the latter are absent, the corresponding balancing circuits may be dispensed with. Thus imbalance between the $\gamma$'s of equations 6 to 11 mainly arises from a fundamental frequency A.C. component of the D.C. source or a second harmonic from the A.C. system and may often safely be ignored.

Figure 6:
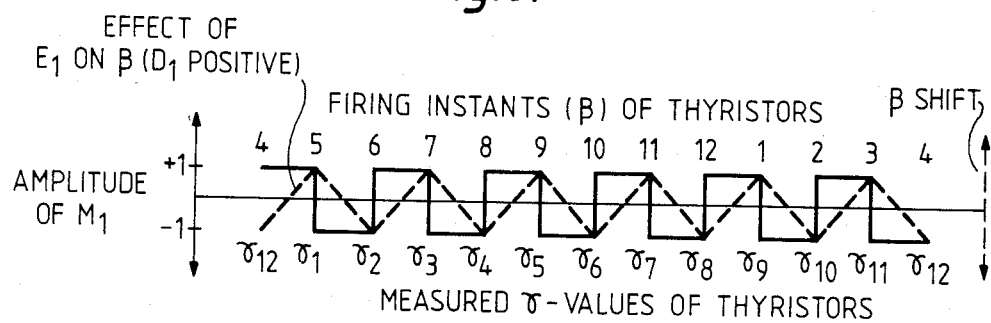
FIG. 6 shows the waveform of one modulating signal for the inverter.
Figure 7:
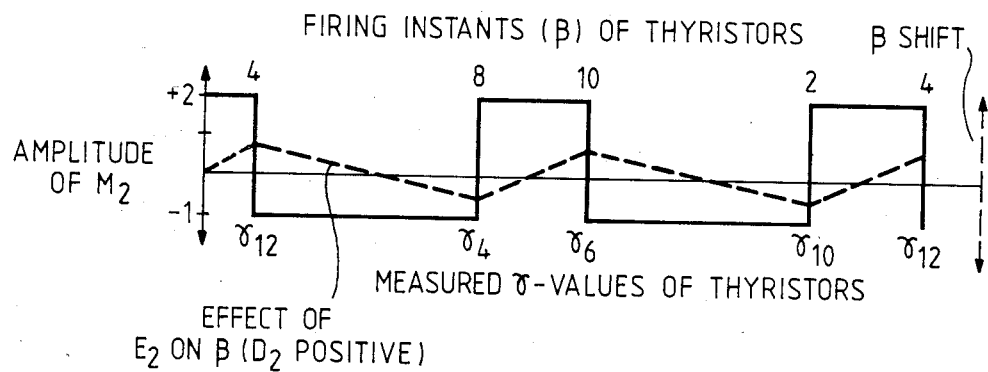
FIG. 7 shows the waveform of another modulating signal for the inverter of FIG. 5.

The operation of the control system of FIG. 5 may be understood by considering the waveforms of modulating signals $M_1$ and $M_2$ shown in FIGS. 6 and 7. Referring firstly to FIG. 6, $M_1$ is shown as a square wave at the 6th harmonic of the A.C. output frequency of the inverter. Since the V.C.O. 19 in FIG. 5 confers an integral characteristic on the control loop, the actual effect of the modulating function $M_1$ when multiplied by the virtually D.C. difference signal $D_1$ (giving error signal $E_1$) will be the integral of $M_1$ multiplied by a positive or negative constant. This effect on the $\beta$ values of the thyristors is shown by the dashed sawtooth waveform. It can be seen that the firing points of the odd-numbered thyristors are delayed while those of the even-numbered thyristors are advanced. $D_1$ is assumed to be positive in FIG. 6 but if it goes negative (for example because of the selective $\beta$ shift applied by the control loop in the state described above) the sawtooth waveform will invert and tend to restore $D_1$ to zero. It should be noted from FIG. 2 that the firing instant of any thyristor n in the inverter of FIG. 1 will be determined by (correspond to) the value of $\gamma$ measured across the anode and cathode of thyristor $(n-4)$.

Referring now to FIG. 7, it can be seen that modulating signal $M_2$ is chosen to have the greatest effect on $\gamma_2$, $\gamma_4$, $\gamma_8$ and $\gamma_{10}$, i.e. it corresponds essentially to equation (2) above. The sawtooth waveform becomes smaller in amplitude and then inverts as $D_2$ decreases in amplitude and goes negative, and thereby balances $\gamma_{10} + \gamma_4$ with $\gamma_8 + \gamma_2$ in the same way that $M_1$ balances $\gamma$ odd with $\gamma$ even.

$M_1$ is chosen to have equal positive and negative amplitudes so as to ensure that in use, the mean value of $E_1$ is zero so that the mean value of $\gamma$ is not affected. The mean value of $E_2$ is arranged to be zero by making the positive amplitude of $M_2$ (during its nominal 30° wide periods) twice as great as its negative amplitude (during its nominal 60° wide periods). The envelope of its effect in changing the firing angles is shown as a dashed sawtooth waveform, having maximum effect on the firing times of those values (no.'s 4, 6, 10 and 12) which influence $\gamma_8$, $\gamma_{10}$, $\gamma_2$ and $\gamma_4$ respectively according to equation (2), with only slight effects on the other $\gamma$ values. The correspondence between the $\gamma$ values and firing instants of the thyristors is indicated schematically in FIGS. 6 and 7, but it should be remembered that each value is in fact a time interval. The waveforms of $M_3$, $M_4$ and $M_5$ are identical to $M_2$ except that they are successively delayed in phase by 30°. If balancing of individual $\gamma$'s according to equation (6) to (11) above is required, a square-wave modulating function at the fundamental A.C. output frequency may be used, and phased so that its corresponding integral (a symmetrical sawtooth function) peaks at the firing instant of the appropriate thyristors.

I claim:

1. In a multi-phase inverter comprising a bridged array of phase-controlled unidirectional semiconductor switching devices and a controllable source of firing pulses for firing said semiconductor switching devices at controlled firing instants, each said switching device having an individual extinction angle, a phase control system linked to said semiconductor switching devices and said source of firing pulses, comprising:

(a) means for measuring the extinction angle of each switching device
    (b) means for comparing the values of selected pairs of sums of one or more selected extinction angles and deriving at least one net difference signal, and
    (c) means for deriving from the at least one net difference signal a control signal for selectively controlling the firing of said controllable source of firing pulses at times corresponding to the firing instants of those switching devices which determine the selected extinction angles.

2. A multi-phase inverter as claimed in claim 1 wherein said sum is of two or more of said extinction angles.

3. A multi-phase inverter as claimed in claim 1, further comprising a multiplier arranged to multiply the at least one net difference signal by a modulating signal to generate said control signal, the modulating signal having a fundamental frequency which is equal to or a harmonic of the A.C. output frequency of the inverter and being phased so as to cause the control signal to have maximum effect on those firing instants which determine said selected extinction angles.

4. A multi-phase inverter as claimed in claim 3 wherein said controllable source of firing pulses comprises a variable frequency oscillator, the output waveform of which triggers said firing pulses, wherein each said modulating signal is substantially a square wave and said control signal is fed as a frequency control signal to said oscillator.

5. A multi-phase inverter as claimed in claim 4, further comprising means for adding a signal representative of the mean extinction angle of said switching devices to said frequency-control signal and means for subtracting a signal representative of a demanded mean extinction angle of said switching devices from said frequency control signal so as to provide negative feedback control of the extinction angles of said switching devices.

6. A multi-phase inverter as claimed in claim 1 wherein said means for comparing the values of selected sums of one or more extinction angles is arranged to compare a number of pairs of sums equal to the number of switching devices and thereby effectively control each individual extinction angle.

7. A multi-phase inverter as claimed in claim 3 wherein said means for comparing the values of selected sums of one or more extinction angles is arranged to compare a number of pairs of sums equal to the number of switching devices and thereby effectively control each individual extinction angle.

8. A multi-phase inverter as claimed in claim 4 wherein said means for comparing the values of selected sums of one or more extinction angles is arranged to compare a number of pairs of sums equal to the number of switching devices and thereby effectively control each individual extinction angle.

9. A multi-phase inverter as claimed in claim 5 wherein said means for comparing the values of selected sums of one or more extinction angles is arranged to compare a number of pairs of sums equal to the number of switching devices and thereby effectively control each individual extinction angle.

* * * * *